US005592205A

United States Patent [19]

Shimizu et al.

[11] Patent Number: 5,592,205

[45] Date of Patent: Jan. 7, 1997

[54] COLOR PRINT HEAD

[75] Inventors: Yukihiko Shimizu; Hiroshi Watanabe, both of Mobara, Japan

[73] Assignee: Futaba Denshi Kogyo K.K., Mobara, Japan

[21] Appl. No.: 191,280

[22] Filed: Feb. 3, 1994

Related U.S. Application Data

[63] Continuation of Ser. No. 953,818, Sep. 30, 1992, abandoned.

[30] Foreign Application Priority Data

Sep. 30, 1991 [JP] Japan .................................... 3-276234

[51] Int. Cl.$^{6}$ ............................... G01D 15/14; H01J 1/46

[52] U.S. Cl. .......................... 347/115; 347/122; 347/232; 347/238; 313/495; 313/497

[58] Field of Search .................................... 347/232, 238, 347/120, 121, 122, 115; 313/306, 308, 310, 112, 585, 586; 345/75

[56] References Cited

U.S. PATENT DOCUMENTS

| | | | |
|---|---|---|---|
| 4,563,613 | 1/1986 | Genovese et al. | 313/497 |
| 4,661,743 | 4/1987 | Matsuoka et al. | 313/496 |
| 4,701,670 | 10/1987 | Watanabe et al. | 315/169.3 |
| 5,105,281 | 4/1992 | Kusaka | 346/107 R X |

FOREIGN PATENT DOCUMENTS

| | | | |
|---|---|---|---|
| 3-121866 | 5/1991 | Japan | B41J 2/525 |

*Primary Examiner*—Benjamin R. Fuller
*Assistant Examiner*—David Yockey
*Attorney, Agent, or Firm*—Oblon, Spivak, McClelland, Maier & Neustadt, P.C.

[57] ABSTRACT

A color print head capable of carrying out color display by means of a single kind of phosphor, forming luminous dots into an accurate configuration and positioning the luminous dots with high accuracy. Three luminous blocks are provided on an inner surface of a substrate. The luminous blocks each include four strip-like anode conductors arranged so as to extend in a direction parallel to a main scanning direction. The anode conductors are formed with through-holes of the same configuration in a manner to be obliquely arranged at the same intervals. The through-holes each are provided therein with a ZnO:Zn phosphor. The substrate is provided on an outer surface thereof with color filters for the respective luminous blocks, to thereby take out primary colors. Light emitted from each of the luminous blocks is guided through each of the color filters and irradiated on the same position, resulting in desired color display being reproduced.

1 Claim, 6 Drawing Sheets

COLOR PRINT HEAD

This application is a Continuation of application Ser. No. 07/953,818, filed on Sep. 30, 1992, now abandoned.

BACKGROUND OF THE INVENTION

This invention relates to an optical write device for a color video printer, a color printer or the like, and more particularly to a color print head incorporating a fluorescent luminous tube therein.

A fluorescent luminous tube which is adapted to select electrons emitted from filamentary cathodes through control electrodes to impinge the electrons on anodes, to thereby provide desired luminescence may be used for a print head for a color printer as exemplified in Japanese Patent Application Laid Open Publication No. 258920/1989.

The conventional fluorescent luminous tube, as taught in the Japanese publication, is so constructed that three strip-like anodes which extend in a direction parallel to a main scanning direction are juxtaposed to each other in a sub-scanning direction on a substrate. The anodes are provided with phosphors R, G and B different in luminous color from each other, respectively. Above the anode are arranged a plurality of grids formed with slits extending in the sub-scanning direction and divided in the main scanning direction. Picture cells are defined by cooperation of a width of the anodes and a width of the slits of the grids and selection of any desired picture cells is carried out, for example, by scanning the anodes and feeding the grids with a print signal. Picture cells respectively emitting lights of R, G and B luminous colors which are arranged in the sub-scanning direction are optionally selected to converge the lights.

Thus, it should be noted that the conventional color print head uses the phosphors R, G and B different in luminous color. In general, a phosphor is deteriorated in luminance with a lapse of lighting time. However, a variation in residual ratio of luminance of a phosphor depends on the type of a phosphor. For example, luminance of a phosphor of a blue luminous color is deteriorated most rapidly. Therefore, the conventional color print head is encountered with a problem that a balance of luminance is varied with a lapse of lighting time, resulting in failing to permit it to exhibit color display required or desired.

A phosphor which has been conventionally used for such a purpose is a sulfide phosphor of which a matrix contains sulfur. Thus, when the sulfur phosphor is excited due to impinge of electrons thereon, it produces sulfide gas such as S, SO, $SO_2$ or the like, resulting in being decomposed and scattered. The decomposed and scattered phosphor then adheres to an oxide layer of the filamentary cathodes to poison them, to thereby deteriorate an electron emission capability of the cathodes.

The above-described sulfide tends to adhere to the phosphor. Such adhesion causes a luminous efficiency of the phosphor to be varied, leading to unstableness of luminance of the phosphor.

Further, a conventional phosphor for color display has a conductive material such as $In_2O_3$, $SnO_2$, ZnO or the like mixedly incorporated therein in an amount of several %. However, it is highly troublesome or difficult to homogeneously incorporate the conductive material in the phosphor. Also, the fact that dimensions of each of luminous dots are as micro as 60 μm×60 μm causes uniform or homogeneous mixing of the conductive material to be substantially impossible. Thus, the conventional phosphor fails to permit the luminous dots to emit light at uniform luminance.

Moreover, the conventional color print head generally requires to superposedly irradiate light of the luminous dots R, G and B on one location at the fully same configuration. In this regard, in the conventional color print head, configuration of the luminous dots is restricted by a width of the slits of the grids and a width of the phosphors deposited on the strip-like anodes. Unfortunately, the phosphors are formed by printing or electrodeposition, so that it is substantially impossible to render dimensions of the phosphors in a width direction of the anodes uniform with precision as high as several microns. This results in a configuration of the luminous dots different in luminous color being non-uniform, to thereby cause bleeding, color shift and the like, leading to deterioration of printing quality of the color printer.

In addition, reproduction of color printing by the conventional color print head is carried out by resolving one dot into R, G and B dots and permitting the R, G and B dots arranged in the sub-scanning direction to emit lights while superposedly converging the lights. Therefore, deterioration in positional accuracy of the R, G and B dots causes color shift, bleeding and the like, leading to further deterioration of printing quality of the color printer. In the conventional color print head, a position of the luminous dots is determined by the slits of the grids, therefore, a failure in accurate positioning of the grids causes positional deviation of the luminous dots.

SUMMARY OF THE INVENTION

The present invention has been made in view of the foregoing disadvantages of the prior art.

Accordingly, it is an object of the present invention to provide a color print head which is capable of carrying out color display by means of a single kind of phosphor.

It is another object of the present invention to provide a color print head which is capable of substantially increasing accuracy of configuration of luminous dots and positioning the luminous dot with high accuracy.

It is a further object of the present invention to provide a color print head which is capable of providing satisfactory printing quality.

In accordance with one aspect of the present invention, a color record device is provided. The color record device includes an electron emitting electrode means, anodes including luminous dots which emit light by means of electrons emitted from the electron emitting electrode means, and control electrodes for controlling electrons emitted from the electron emitting electrode means. The luminous dots each are formed of a phosphor having a luminous spectrum of two or more colors. The device also includes color filters different in color for taking out light emitted from the luminous dots.

In accordance with another aspect of the present invention, a color print head is provided. The color print head includes a light-permeable substrate and a plurality of luminous blocks formed on the substrate so as to be juxtaposed to each other in a sub-scanning direction. The luminous blocks each includes anode conductors arranged on an inner surface of the substrate so as to extend in a direction parallel to a main scanning direction. The color print head also includes luminous dots each formed of the same phosphor of the same configuration deposited at the same position in the main scanning direction in the anode conductors positionally corresponding to each other among the luminous blocks, cathodes for emitting electrons, control electrodes for controlling the electrons emitted from the cathodes, a casing sealedly mounted on an inner surface of the substrate to cover the control electrodes and cathodes, and a plurality of color filters different in color which are provided for the respective luminous blocks on an outer surface of the substrate.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like or corresponding parts throughout; wherein.

DETAILED DESCRIPTION OF THE PREFERRED EMBODIMENT

Now, a color print head according to the present invention will be described hereinafter with reference to the accompanying drawings.

Figure 1:
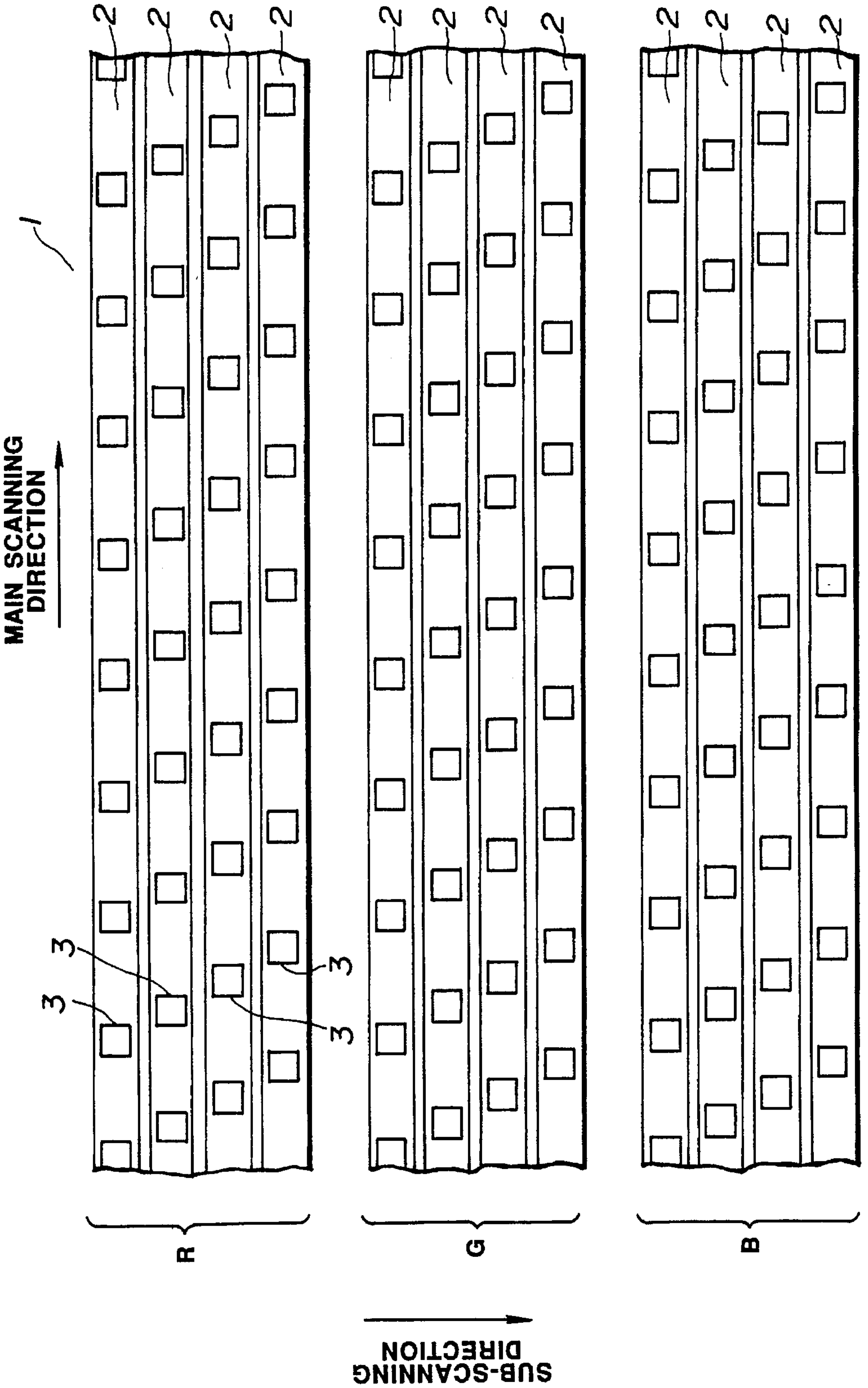
FIG. 1 is a plan view showing a pattern of arrangement of strip-like anode conductors on a substrate in an embodiment of a color print head according to the present invention.

FIGS. 1 to 6 illustrate an embodiment of a color print head according to the present invention. A color print head of the illustrated embodiment, as shown in FIG. 1, includes a transparent or light-permeable substrate 1 made of glass, which is provided on an inner surface thereof with strip-like anode conductors 2 made of an aluminum thin film. The strip-like anode conductors 2 are arranged so as to extend in a direction parallel to a main scanning direction and each adjacent four of the anode conductors 2 are juxtaposed to each other at predetermined intervals in a sub-scanning direction to form each luminous block. Three such luminous blocks R, G and B thus formed are juxtaposed in the sub-scanning direction.

The strip-like anode conductors 2, as shown in FIG. 1, each are formed with a plurality of through-holes 3 of the same square shape so as to be spaced from each other at intervals four times as large as a length of the through-hole 3 in the main scanning direction. In each of the luminous blocks, the through-holes 3 are arranged so as to be deviated from each other in turn by a distance corresponding to one quarter as long as the interval of the through-holes 3 between the respective adjacent strip-like anode conductors 2. Further, the through-holes 3 are arranged at the same positions in the main scanning direction on the strip-like anode conductors 2 positionally corresponding to each other among the luminous blocks R, G and B adjacent in order, The strip-like anode conductors 2 and through-holes 3 arranged in such a pattern as described above may be formed with high precision by depositing an aluminum thin film all over the substrate 1 by sputtering and forming the above-described pattern by photolithography.

Figure 2:
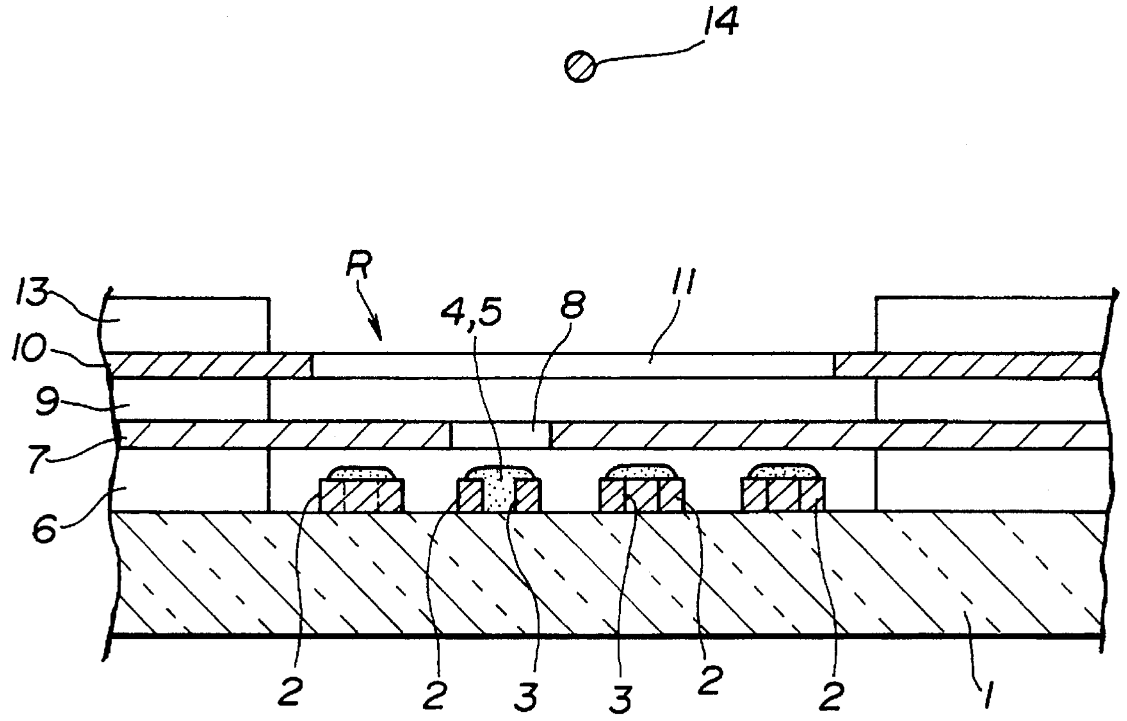
FIG. 2 is a fragmentary sectional view of the color print head shown in FIG. 1.
Figure 3:
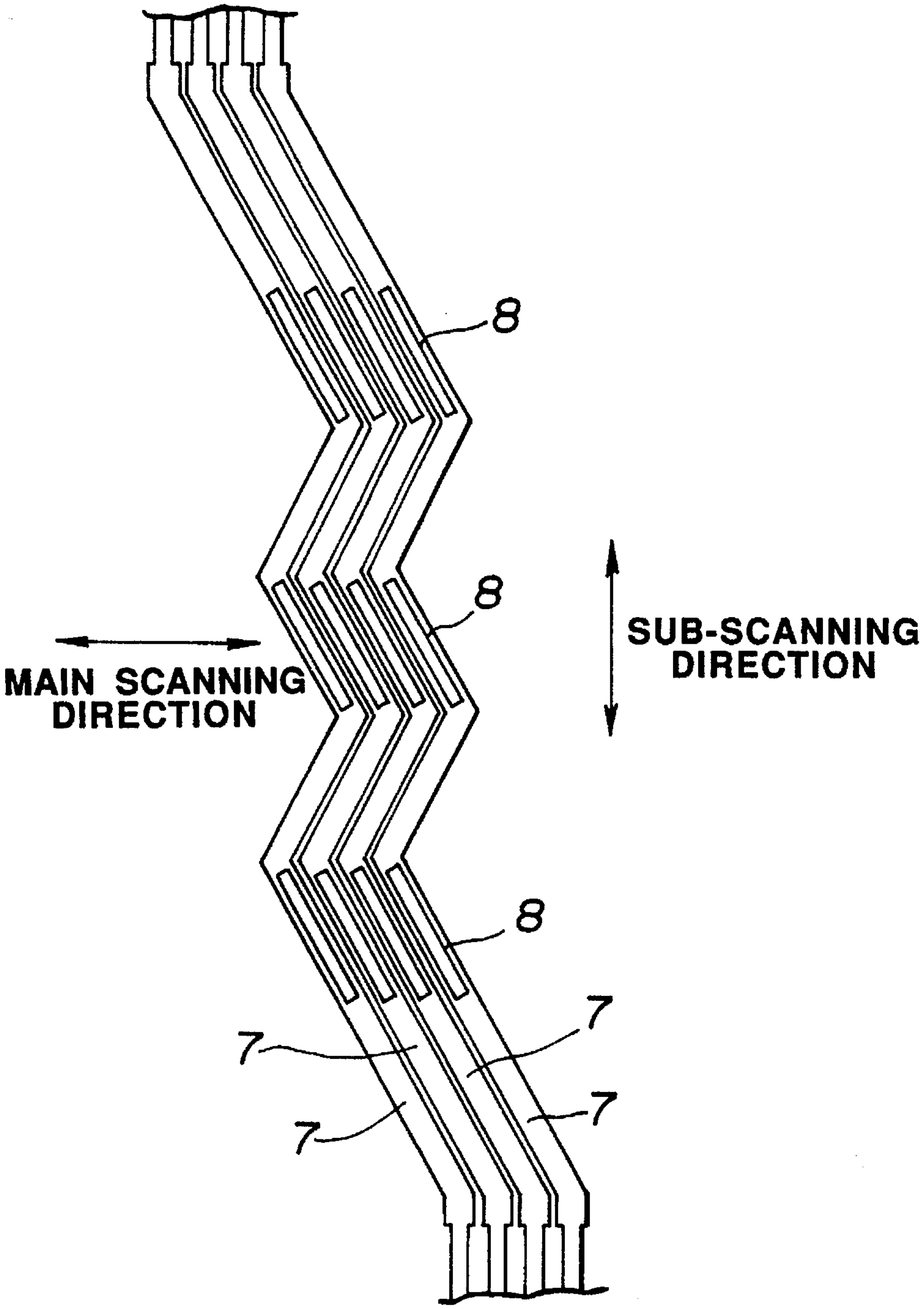
FIG. 3 is a plan view showing second control electrodes incorporated in the color print head shown in FIG. 1.

The through-holes 3, as shown in FIG. 2, each are provided therein with a phosphor 4, to thereby provide a number of luminous dots 5. The phosphor 4 is made of a ZnO:Zn phosphor material and common to the luminous blocks R, G and B. The ZnO:Zn phosphor is decreased in resistance, so that arrangement of the phosphor 4 in each of the through-holes 3 in a manner to be contacted with a peripheral surface of the through-hole 3 is merely required to permit the phosphor 4 to be satisfactorily electrically connected with the strip-like anode conductor, to thereby eliminate a necessity of mixedly incorporating any conductive material in the phosphor. Also, such arrangement of the phosphor permits a luminous configuration of the luminous dots 5 to coincide with the position and configuration of the through-holes 3, to thereby render a luminous area uniform among the luminous dots, resulting in the luminous dots producing the same quantity of light. In the illustrated embodiment, the phosphor 4 is deposited on an upper surface of each of the strip-like anode conductors 2 as well as in the through-hole 3.

As shown in FIG. 2, the substrate 1 is provided thereon with insulating layers 6 of a predetermined thickness among the luminous blocks R, G and B by printing. The insulating layers 7 each are provided thereon with second control electrodes 7. The second control electrodes 7 each comprise an elongated electrode arranged so as to extend in the sub-scanning direction and are provided with three obliquely extending slits 8 each acting as a light-permeable section. The second control electrodes 7 are electrically separated from each other, resulting in being applied thereto a control voltage independently from each other. As described above, the luminous blocks R, G and B each include a number of four-in-a-set luminous dots 5 obliquely arranged. The second control electrodes 7 are formed and arranged in such a manner that the three slits 8 of each of the second control electrodes 7 correspond to three oblique arrays of the luminous dots 5 of the respective luminous blocks R, G and B arranged in the sub-scanning direction. Thus, the second control electrodes 7 each correspond to the luminous blocks R, G and B of three luminous colors and can be driven by means of each one driving IC. The slits 8 of the second control electrode 7 do not define a configuration of the luminous dots 5, therefore, it is not required to form the slits 8 with high accuracy. The slits may be replaced with holes formed independently so as to correspond to the individual luminous dots.

Figure 4:
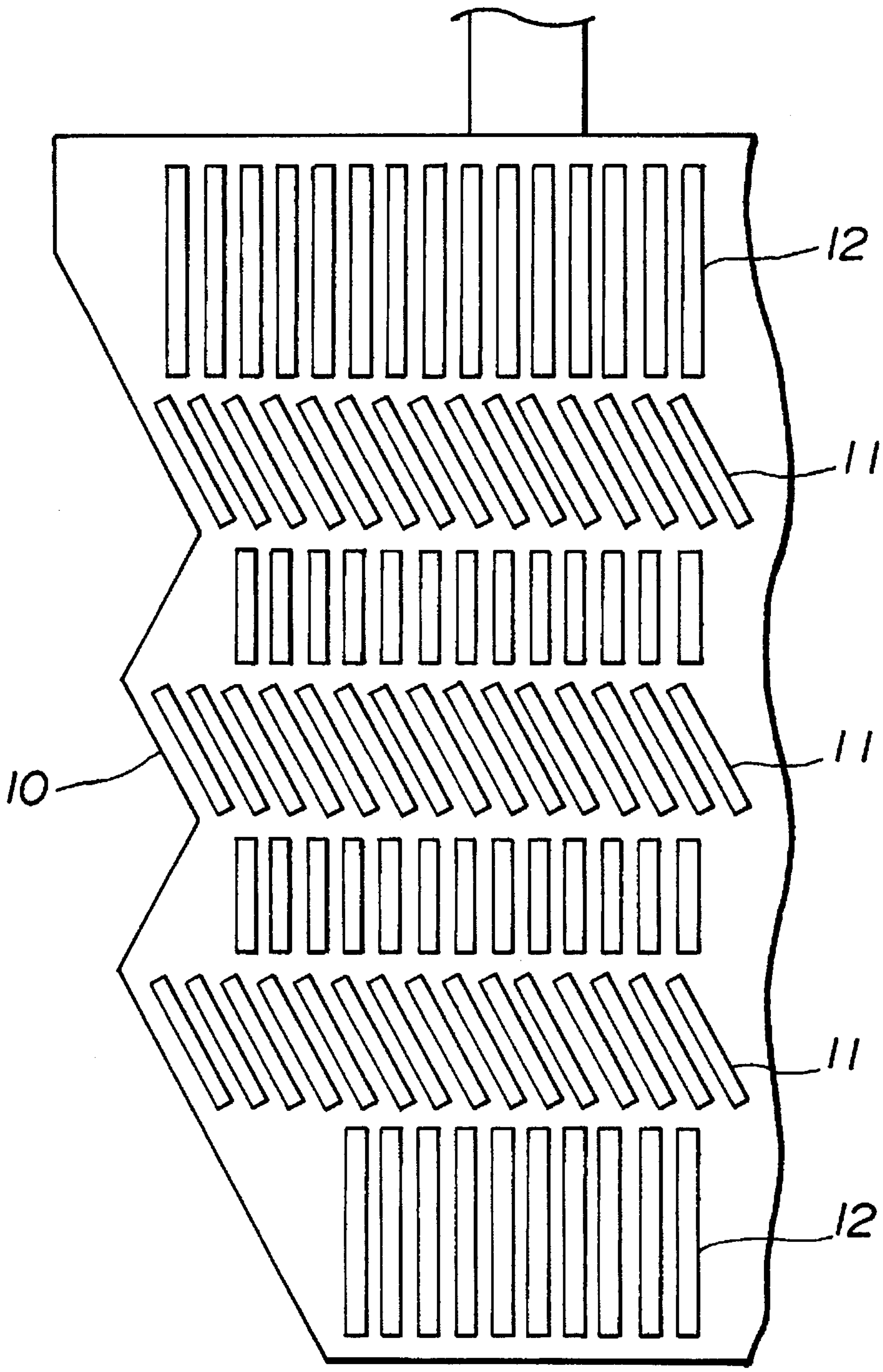
FIG. 4 is a plan view showing a first control electrode incorporated in the color print head shown in FIG. 1.

The color print head of the illustrated embodiment, as shown in FIG. 2, also includes a first control electrode 10 through glass spacers 9 arranged above the second control electrodes 7. The first control electrode 10, as shown in FIG. 4, is made of a single metal plate and is fed with a common control voltage. The first control electrode 10 is formed with a number of slits 11 corresponding to oblique arrays of the luminous dots 5 of the luminous blocks R, G and B. The slits 11 each are formed into a size larger than the slits 8 of the second control electrodes 7.

The first control electrode 10 is formed at both ends thereof with apertures 12, which are fixed through glass spacers 13 and adhesive to the glass spacers 9. Such arrangement of the apertures 12 permits a reactive current to be reduced as compared with non-arrangement of the apertures.

Above the first control electrode 10 are stretchedly arranged filamentary cathodes 14 so as to extend in the main scanning direction for every luminous block R, G and B. On an upper surface of the substrate 1 is sealedly mounted a casing 15 formed of side plates and a rear plate into a box-like shape, resulting in providing an envelope 16 in which various electrodes and the like are housed. The envelope 16 is then evacuated to a high vacuum. The rear plate and side plates of the envelope 16 each are provided thereon with a shielding film for preventing external light from entering the envelope, to thereby prevent flare.

Figure 5:
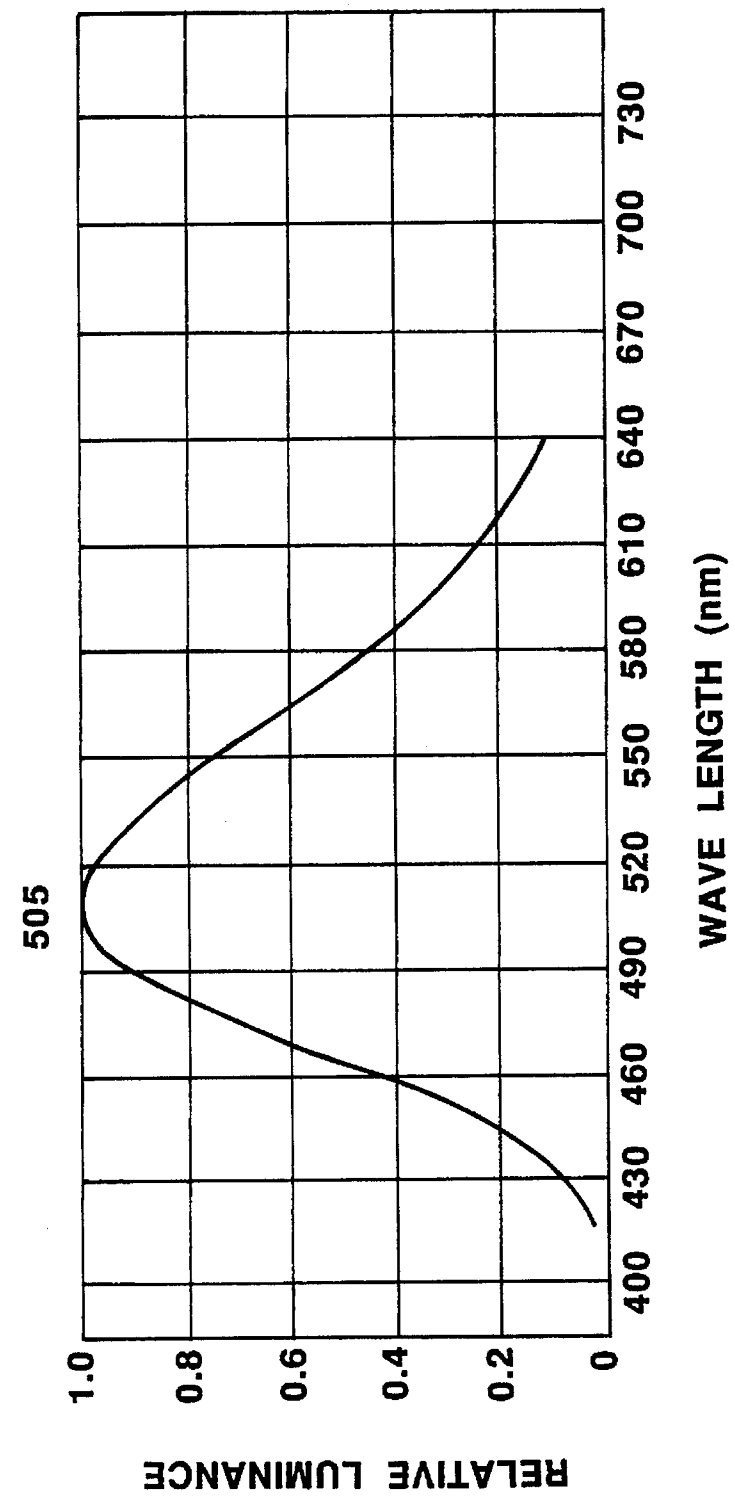
FIG. 5 is a graphical representation showing a luminous spectrum of a ZnO:Zn phosphor.
Figure 6:
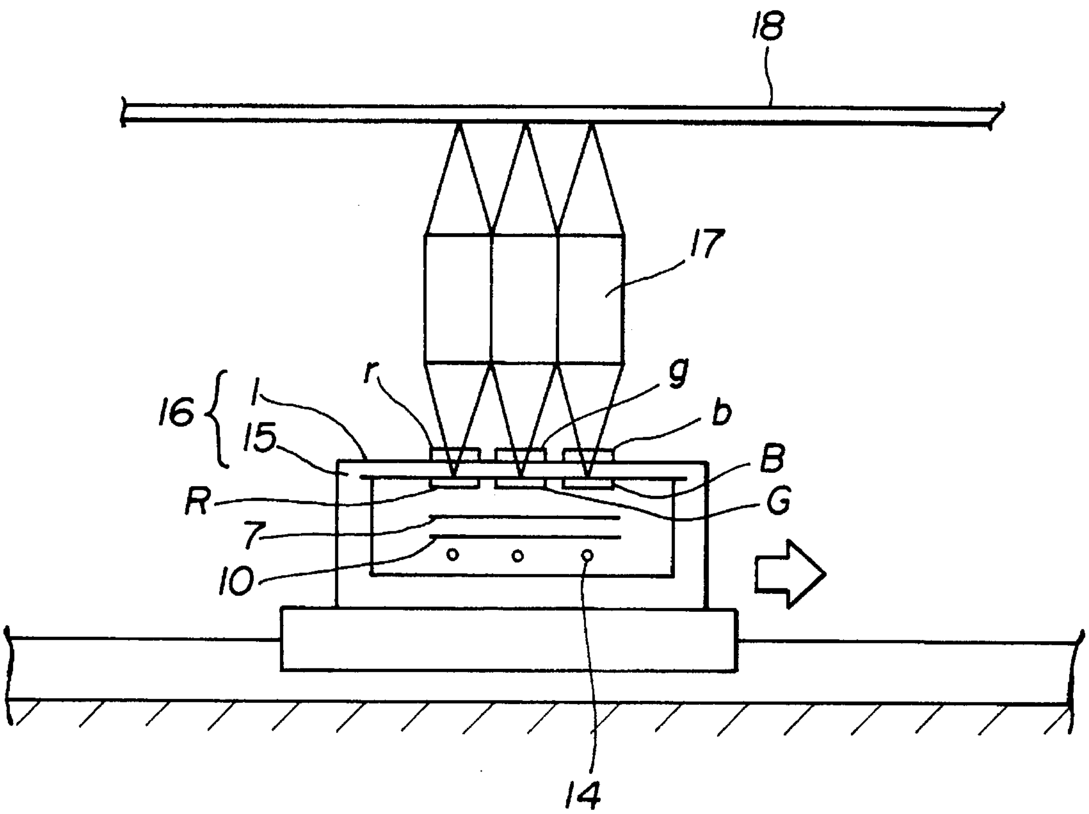
FIG. 6 is a schematic view showing the manner of operation of a color print head according to the present invention.

The substrate 1, as shown in FIG. 6, is provided on an outer surface thereof with an R filter r, which is arranged opposite to the luminous block R and serves as a color filter. Likewise, the substrate 1 is provided with a G filter g and a B filter b each serving as a color filter in a manner to be opposite to the luminous blocks G and B, respectively. Thus, the R, G and B filters r, g and b take out luminescence of the ZnO:Zn phosphor in the form of three primary colors R, G and B, respectively. As shown in FIG. 5, An emission spectrum of the ZnO:Zn phosphor has a peak at a wavelength of about 505 nm corresponding to a green color, as well as a highly increased peak width of from about 430 nm to about 640 nm. Light of such a broad width permits the color filters r, g and b to take out the three primary colors R, G and B.

Now, the manner of operation of the color print head of the illustrated embodiment constructed as described above will be described hereinafter.

Driving of the color print head is carried out by scanning the strip-like anode conductors 2 in order and applying a positive printing signal to desired ones of the second control electrodes in synchronism with the scanning of the anode conductors. The first control electrode 10 is constantly applied thereto a positive voltage to accelerate electrons, to thereby prevent any display defect due to the second control electrodes 7 to which a negative voltage is applied corresponding to a nonluminous portion of the anodes.

As shown in FIG. 6, lights emitted from the luminous dots 5 of the luminous blocks R, G and B are guided through the R, G and B filters r, g and b and then converged through lenses 17 onto predetermined positions on a film 18. Transfer of the color print head in the sub-scanning direction indicated at an arrow in FIG. 6 in time to the driving of the color print head permits lights of the same configuration emitted from the luminous dots for the respective colors resolved to be collected on the same positions, resulting in a desired color image being formed on the film 18.

As can be seen from the foregoing, the color print head of the present invention is constructed in the manner that the phosphors are provided in the through-holes formed via the strip-like anode conductors to form the luminous dots, so that the luminous blocks each are constituted by the luminous dots of the same phosphor. Also, the present invention is constructed so as to take out different colors from the respective luminous blocks through the color filters different in color.

Such construction of the present invention effectively prevents a luminous efficiency from being varied depending on the luminous dot with a lapse of lighting time because only one kind of phosphor is incorporated in the present invention, thus, there occurs no difference in lifetime between the luminous dots and therefore the luminous colors. Therefore, the color print head of the present invention exhibits highly stable luminous balance, to thereby carry out desired full-color printing.

The phosphor used in the color print head of the present invention is free of sulfur, so that the present invention effectively prevents electron emitting characteristics of the cathodes from being deteriorated by sulfide, to thereby constantly ensure display of high luminance.

Also, the present invention permits a configuration of the luminous dots and their position to be accurately set, for example, by subjecting an aluminum film to photolithography, so that the luminous dots for R, G and B colors may be formed into the same configuration while being kept at the same positional relationship. Thus, superposition of the R, G and B colors is accomplished with high accuracy, to thereby prevent deterioration in printing quality such as color shift, bleeding and the like.

In general, a fluorescent print head of the front emission type is adapted to permit light emitted from a phosphor to be observed through light-permeable anode conductors as well as a light-permeable substrate. In the present invention, a configuration of the luminous dots is defined by the through-holes of the anode conductors, so that light emitted from the phosphors may be directly observed through only the substrate from the though-holes, resulting in light absorption being substantially reduced to lead to an increase in luminance.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

We claim:

1. A color print head comprising:

a light permeable substrate;

a first plurality of strip-like anode conductors corresponding to a red color and arranged in parallel on the substrate, each of said strip-like conductors having through holes, wherein adjacent through holes on adjacent ones of said strip-like anode conductors are offset with respect to each other in a main scanning direction by one through hole;

a second plurality of strip-like anode conductors corresponding to a green color and arranged in parallel on the substrate, each of said strip-like conductors having through holes, wherein adjacent through holes on adjacent ones of said strip-like anode conductors are offset with respect to each other in a main scanning direction by one through hole;

a third plurality of strip-like anode conductors corresponding to a blue color and arranged in parallel on the substrate, each of said strip-like conductors having through holes, wherein adjacent through holes on adjacent ones of said strip-like anode conductors are offset with respect to each other in a main scanning direction by one through hole;

phosphorous material formed in each of the through holes, each formation of the phosphorous material in the through holes being of an identical material;

a plurality of cathode electrodes for emitting electrons to be received by said phosphorous material;

control electrodes formed between said cathode electrodes and said anode electrodes in a sub-scanning direction oblique to the direction of the main scanning direction and each of said control electrodes having slits, each of said slits being arranged above said through holes;

a red filter arranged above the first plurality of strip-like anodes;

a green filter arranged above the second plurality of strip-like anodes;

a blue filter arranged above the third plurality of strip-like anodes; and wherein, the control electrodes are selectively charged to cause respective phosphorous material in the through holes to emit light which passes through a corresponding red, green or blue filter to produce a red, green, or blue beam of light.

* * * * *